(12) United States Patent
Lucas et al.

(10) Patent No.: US 7,905,305 B2
(45) Date of Patent: Mar. 15, 2011

(54) BLOW-MOLDED WHEELS HAVING UNDULATING TREADS, METHODS FOR PRODUCING THE SAME, AND CHILDREN'S RIDE-ON VEHICLES INCLUDING THE SAME

(75) Inventors: Christopher F. Lucas, Cheektowaga, NY (US); John Rhein, Chula Vista, CA (US); Gerald P. Sitarski, Grand Island, NY (US); Steven R. Drosendahl, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/509,439

(22) Filed: Aug. 23, 2006

(65) Prior Publication Data

US 2008/0006456 A1    Jan. 10, 2008

Related U.S. Application Data

(60) Provisional application No. 60/819,262, filed on Jul. 7, 2006.

(51) Int. Cl.
*B60K 1/00* (2006.01)
(52) U.S. Cl. .......................... 180/65.1; 180/908
(58) Field of Classification Search ......... 180/65.1–65.8
See application file for complete search history.

(56) References Cited

U.S. PATENT DOCUMENTS

| 1,930,835 | A | * | 10/1933 | Clapper ........................ 301/43 |
| 2,601,700 | A | | 7/1952 | Pinsky et al. |
| 3,029,468 | A | | 4/1962 | Valyi |
| 3,264,780 | A | | 8/1966 | Doe |
| 3,373,460 | A | | 3/1968 | Ladney, Jr. |
| 3,592,885 | A | | 7/1971 | Goins et al. |
| 3,616,491 | A | | 11/1971 | Vollers |

(Continued)

FOREIGN PATENT DOCUMENTS

DE    10125824 A1    12/2002

(Continued)

OTHER PUBLICATIONS

English-language abstract of German Patent No. DE 10125824A1, 2002.

(Continued)

*Primary Examiner* — J. Allen Shriver, II
*Assistant Examiner* — Katy Meyer
(74) *Attorney, Agent, or Firm* — Dascenzo Intellectual Property Law, P.C.

(57) ABSTRACT

Improved blow-molded wheels, methods for producing the same, and children's ride-on vehicles including the same are disclosed. The blow-molded wheels may include a blow-molded wheel body that is configured to rotate about an axis and has a tread surface that extends circumferentially around the wheel body and may have a circumferential profile that is defined as the locus of points at which the radial distance from the axis to the tread surface is greatest at each position around the circumference of the tread surface. The radial distance from the axis to the circumferential profile may change from a first radius to a second radius that is larger than the first radius at a plurality of spaced-apart positions along the circumferential profile. The method for producing the blow-molded wheels may include providing a mold with pinch-off rings that have an opening configured to form the circumferential profile.

26 Claims, 6 Drawing Sheets

U.S. PATENT DOCUMENTS

| | | | |
|---|---|---|---|
| 3,692,453 A | 9/1972 | Quigg | |
| 3,730,658 A | 5/1973 | Marra | |
| 3,779,688 A | 12/1973 | Jullien-Davin | |
| 3,817,676 A | 6/1974 | Seefluth | |
| 3,851,029 A | 11/1974 | Cornett, III et al. | |
| 3,888,545 A | 6/1975 | Braun | |
| 3,907,370 A | 9/1975 | Bard | |
| 3,936,264 A | 2/1976 | Cornett, III et al. | |
| 4,063,868 A | 12/1977 | Piotrowski | |
| 4,323,411 A | 4/1982 | Uhlig | |
| 4,513,981 A * | 4/1985 | DeGraaff et al. | 280/828 |
| 4,516,648 A * | 5/1985 | Berger et al. | 180/6.66 |
| 4,531,704 A | 7/1985 | Matthei | |
| 4,588,542 A | 5/1986 | Pierce | |
| 4,717,113 A | 1/1988 | Martin | |
| 4,832,307 A | 5/1989 | Watanabe et al. | |
| 4,854,849 A | 8/1989 | Sudo | |
| 4,884,961 A | 12/1989 | Iizuka et al. | |
| 4,889,480 A | 12/1989 | Nakamura et al. | |
| 5,104,198 A | 4/1992 | Prout et al. | |
| 5,219,594 A | 6/1993 | Meyer et al. | |
| 5,227,114 A | 7/1993 | Moore | |
| 5,316,135 A | 5/1994 | Kneer et al. | |
| 5,316,377 A | 5/1994 | Markling et al. | |
| 5,368,371 A | 11/1994 | Markling | |
| 5,518,682 A | 5/1996 | Markling et al. | |
| 5,553,878 A * | 9/1996 | Davignon et al. | 280/229 |
| 5,556,601 A | 9/1996 | Huvey et al. | |
| 5,573,129 A | 11/1996 | Nagata et al. | |
| 5,736,168 A | 4/1998 | Goyal et al. | |
| 5,750,067 A | 5/1998 | Hellbrugge | |
| 5,799,809 A | 9/1998 | Sako et al. | |
| 5,810,452 A | 9/1998 | Hawthorne et al. | |
| 5,908,124 A | 6/1999 | Klauke et al. | |
| 5,924,506 A * | 7/1999 | Perego | 180/65.5 |
| 6,068,161 A | 5/2000 | Soehnlen et al. | |
| 6,095,543 A * | 8/2000 | McMahon et al. | 280/282 |
| 6,170,920 B1 | 1/2001 | Markling | |
| 6,318,983 B1 | 11/2001 | Lopez et al. | |
| 6,431,406 B1 | 8/2002 | Pruett | |
| 6,464,305 B2 | 10/2002 | Markling | |
| 6,520,597 B1 | 2/2003 | Markling | |
| 6,591,986 B2 | 7/2003 | Soehnlen et al. | |
| 6,615,885 B1 * | 9/2003 | Ohm | 152/11 |
| 6,872,354 B1 | 3/2005 | Mol et al. | |
| 6,896,335 B2 | 5/2005 | Markling | |
| 6,913,324 B2 | 7/2005 | Markling | |
| 6,953,333 B1 | 10/2005 | Feuerherm et al. | |
| 2003/0085611 A1 | 5/2003 | Markling | |
| 2004/0070262 A1 * | 4/2004 | Markling | 361/64.701 |
| 2005/0056474 A1 * | 3/2005 | Damon | 180/68.5 |
| 2006/0073289 A1 | 4/2006 | Bahnsen | |
| 2006/0231303 A1 * | 10/2006 | Fobean et al. | 180/65.1 |

FOREIGN PATENT DOCUMENTS

| | | |
|---|---|---|
| JP | 63202410 | 8/1988 |
| JP | 63278806 | 11/1988 |
| JP | 1-034721 | 2/1989 |
| JP | 4-65219 | 3/1992 |
| JP | 5-124095 | 5/1993 |
| JP | 2002-192607 | 7/2002 |
| WO | WO 2005085034 A1 * | 9/2005 |

OTHER PUBLICATIONS

English-language abstract of Japanese Patent Publication No. JP 2002-192607, 2002.
English-language abstract of Japanese Patent No. JP 5-124095, 1993.
English-language abstract of Japanese Patent No. JP 4-65219, 1992.
English-language abstract of Japanese Patent No. JP 1-034721, 1989.
International Search Report and Written Opinion for Application No. PCT/US07/14750.

* cited by examiner

BLOW-MOLDED WHEELS HAVING UNDULATING TREADS, METHODS FOR PRODUCING THE SAME, AND CHILDREN'S RIDE-ON VEHICLES INCLUDING THE SAME

RELATED APPLICATION

The present application claims priority to U.S. Provisional Patent Application Ser. No. 60/819,262, which was filed on Jul. 7, 2006, and the complete disclosure of which is hereby incorporated by reference herein for all purposes.

FIELD OF THE DISCLOSURE

The present disclosure relates to children's ride-on vehicles, and more particularly to blow-molded wheels for children's ride-on vehicles.

BACKGROUND OF THE DISCLOSURE

Children's ride-on vehicles are reduced-scale vehicles that are designed and sized for use by children. For example, children's ride-on vehicles include a seat adapted to accommodate one or more children as well as steering and drive assemblies that are adapted to be operated by a child sitting on the seat. The drive assembly is adapted to drive the rotation of one or more of the vehicle's wheels and may include a battery-powered motor assembly or a manually powered drive assembly, such as a pedal-powered drive assembly.

The wheels used on children's ride-on vehicles are often blow-molded from a suitable material, such as a plastic. Blow-molded wheels are conventionally formed using a mold that has two portions. The portions of the mold collectively define a cavity that defines, or corresponds to, the shape of the blow-molded wheels. During the blow-molding process, a parison of molten plastic is introduced into the mold cavity and a pressurized gas, such as air, is used to force the molten plastic against the internal surface of the cavity in order to form a hollow wheel having a shape defined by the internal surface of the cavity. After a brief cooling period, the mold portions are separated, typically in an axial direction.

Each of the mold portions may include what is referred to as a pinch-off ring that may squeeze and/or cut the parison of molten plastic that is inserted into the mold to produce the wheel (when air is injected to inflate the parison against the interior surface of the mold). In particular, as the mold portions close on and/or around the parison, the pinch-off rings come together to cut and/or pinch off the portion of the parison that remains outside the mold cavity. The pinching effect of the pinch-off rings may leave a seam, or part line, on the finished wheel.

The part line caused by the pinch-off rings often lies in a plane passing through the center of the outer circumference of the wheel. Conventionally, this plane is often normal to the axis of the wheel. In such a configuration, the part line may define the central circumference of the wheel. Typically, the pinch-off rings have a circular geometry such that the circumferential seam, or part line, on a blow-molded wheel has a uniform diameter around the circumference of the wheel. In particular, the central circumference of a blow-molded wheel is typically circular in shape. The central circumferential region of the wheel includes a circular ground-contacting, or "run-flat," surface of the wheel, which conventionally is approximately one inch wide. On such a wheel, the part line is typically centered in the run-flat region. Examples of blow-molded wheels having circular central circumferential regions are shown in U.S. Pat. Nos. 4,513,981 and 5,368,371, the complete disclosures of which are hereby incorporated by reference for all purposes.

Children's ride-on vehicles are subject to being driven on a variety of surfaces, including concrete, dirt, and grass, as well as up and down hills. Oftentimes, ride-on vehicles must surmount various obstacles on the driving surface, such as sticks, rocks, curbs, tool handles, hoses, pieces of lumber, etc. However, the ability of wheels that have a circular central circumferential region to surmount such obstacles, or otherwise engage a given driving surface, is generally limited to the frictional engagement between the circular ground-contacting surface of the wheel and the obstacle or driving surface. The wide range of potential obstacles and driving surfaces that may potentially be encountered by a ride-on vehicle make it desirable to provide a wheel that may more readily engage and travel over a greater degree of obstacles than conventional blow-molded ride-on wheels.

SUMMARY OF THE DISCLOSURE

The present disclosure is directed to blow-molded wheels having undulating treads, methods for producing the same, and children's ride-on vehicles including the same.

The blow-molded wheels may include a blow-molded wheel body that is configured to rotate about an axis and has a tread surface that extends circumferentially around the wheel body. The tread surface may have a circumferential profile that is defined as the locus of points at which the radial distance from the axis to the tread surface is greatest at each position around the circumference of the tread surface. The radial distance from the axis to the circumferential profile may change from a first radius to a second radius that is larger than the first radius at a plurality of spaced-apart positions along the circumferential profile. In some exemplary embodiments, the tread surface may include a base surface, which may define a first radius of the circumferential profile, and a plurality of spaced-apart tread partitions, or tread blocks, that may be disposed on the base surface, which may define a second radius of the circumferential profile that is larger than the first radius.

The methods for producing the blow-molded wheels may include providing a mold that has first and second mold portions. The first and second mold portions may collectively define a mold cavity that is configured and sized to mold a wheel having an axis. The first and second mold portions may be configured to separate in a direction parallel to the axis of the wheel. Either or both of the first and second mold portions may include a pinch-off ring having an opening configured to form a circumferential profile on the wheel. The pinch-off ring(s) may include a plurality of regions of the opening having a first radius and a plurality of regions of the opening having a second radius that is larger than the first radius.

The method for producing the blow-molded wheels may further include forming a parison of molten material, positioning the parison between the first and second mold portions, and closing the first and second mold portions on the parison such that the pinch-off ring(s) of the first and/or second mold portions impinge on the parison to form a circumferential profile for a blow-molded wheel. A pressurized gas may be injected into the parison to blow the parison into a blow-molded wheel having a shape corresponding to the shape of the mold cavity, including regions of the wheel corresponding to the plurality of regions having the first radius and the plurality of regions having the second radius. The mold portions may be separated to release the blow-molded wheel from the mold.

The blow-molded wheels may be used in a children's ride-on vehicle. The children's ride-on vehicle may include a body having at least one seat sized for a child and a plurality of wheels rotatably coupled to the body. The plurality of wheels may include at least one driven wheel and at least one steerable wheel. The children's ride-on vehicle may further include a steering assembly and a drive assembly. The steering assembly may include a steering mechanism adapted to receive steering inputs from a child sitting on the at least one seat and a steering linkage adapted to convey the steering inputs to the at least one steerable wheel. The drive assembly may be adapted to selectively drive the rotation of the at least one driven wheel. The drive assembly may be a motorized drive assembly or a manually powered drive assembly.

DETAILED DESCRIPTION AND BEST MODE OF THE DISCLOSURE

Figure 1:
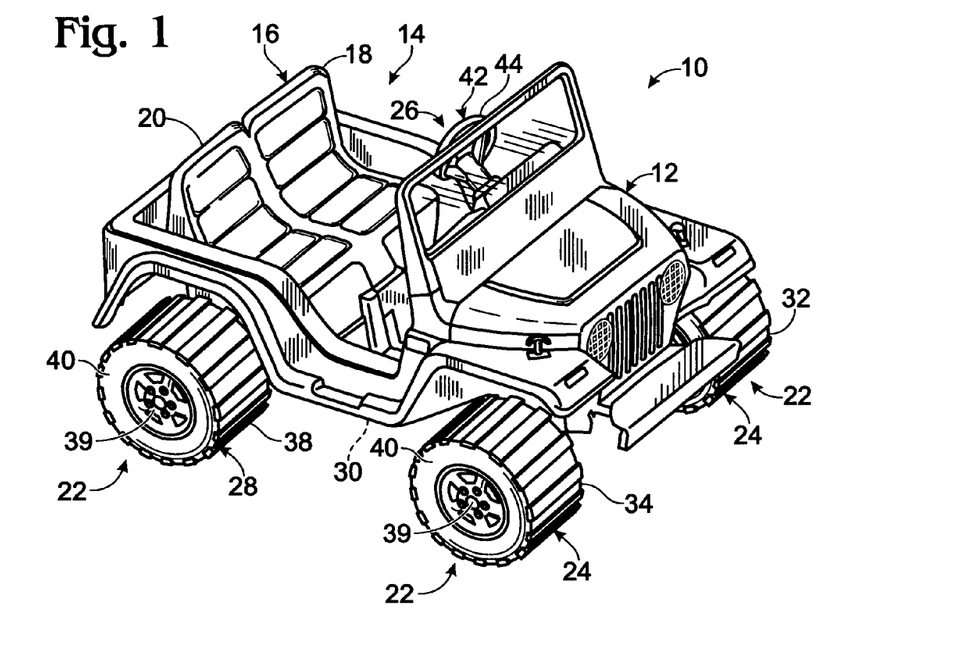
FIG. 1 is an isometric view of a children's ride-on vehicle having at least one blow-molded wheel according to the present disclosure.

An illustrative, non-exclusive example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include, or be mounted upon, an underlying frame, or chassis, or chassis portion, on which the rest of the body (which may be referred to as a body portion) is supported. The chassis portion may be formed from the same or different materials as the rest of the body; when present, the chassis portion is often formed of metal and/or molded plastic, with the body portion typically being formed of molded plastic. However, these illustrative examples of suitable materials of construction are not required.

As shown, body 12 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle.

Figure 2:
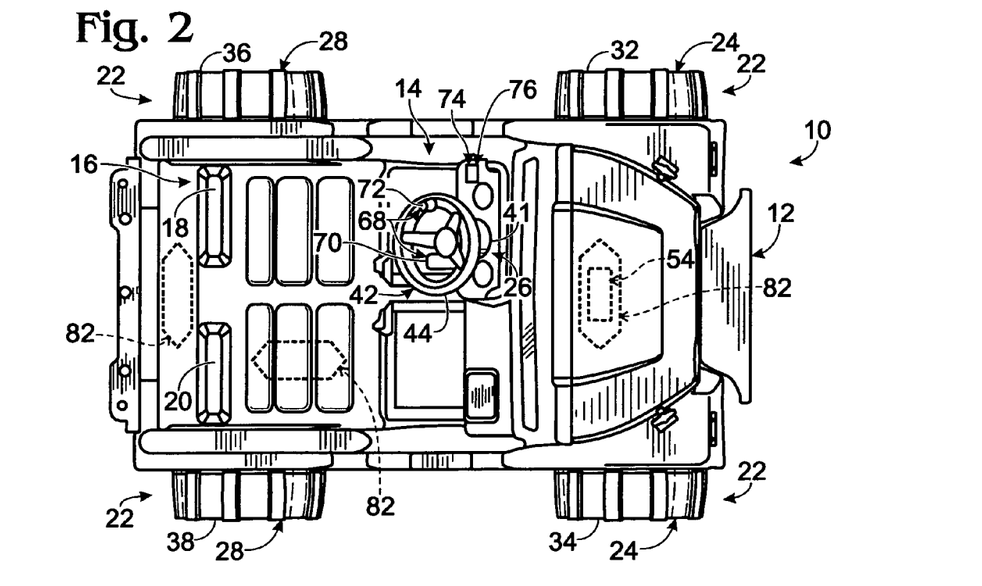
FIG. 2 is a top plan view of the children's ride-on vehicle of FIG. 1 with another example of blow-molded wheels according to the present disclosure.

Vehicle 10 also includes a plurality of wheels 22 that are rotatably coupled to body 12, as indicated in FIGS. 1-2. As discussed in more detail herein, the plurality of wheels includes at least one wheel having an undulating tread, such as one or more of the illustrative wheels shown and/or discussed with respect to FIGS. 5-8 and 12. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated in response to a rotational input from the vehicle's drive assembly, which is either directly conveyed to the wheel by the output of a motor assembly or pedal assembly, or which is conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels. However, children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

Some or all of the plurality of wheels 22 may include a hub portion 39 and a tire portion 40, as indicated in FIG. 1. When present, the hub and tire portions may be integrally formed or the hub and tire portions may be formed as a separate parts that are secured together by screws, bolts, clips, adhesives, or other suitable fasteners or fastening methods. The hub and tire portions may be formed from the same or different materials. In some embodiments, hub portion 39 and tire portion 40 may be formed from materials having different colors, such as differently colored plastics. For example, hub portion 39 may (but is not required to) be formed from a silver-colored plastic to simulate a metal hub, while tire portion 40 may (but is not required to) be formed from a black-colored plastic to simulate a rubber tire.

A portion of the vehicle's steering assembly 26 is shown in FIGS. 1 and 2 and includes a steering column 41 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 41 includes any suitable mechanical linkage that conveys a child's steering inputs from the steering mechanism to the vehicle's steerable wheel assembly, thereby steering the vehicle.

Figure 3:
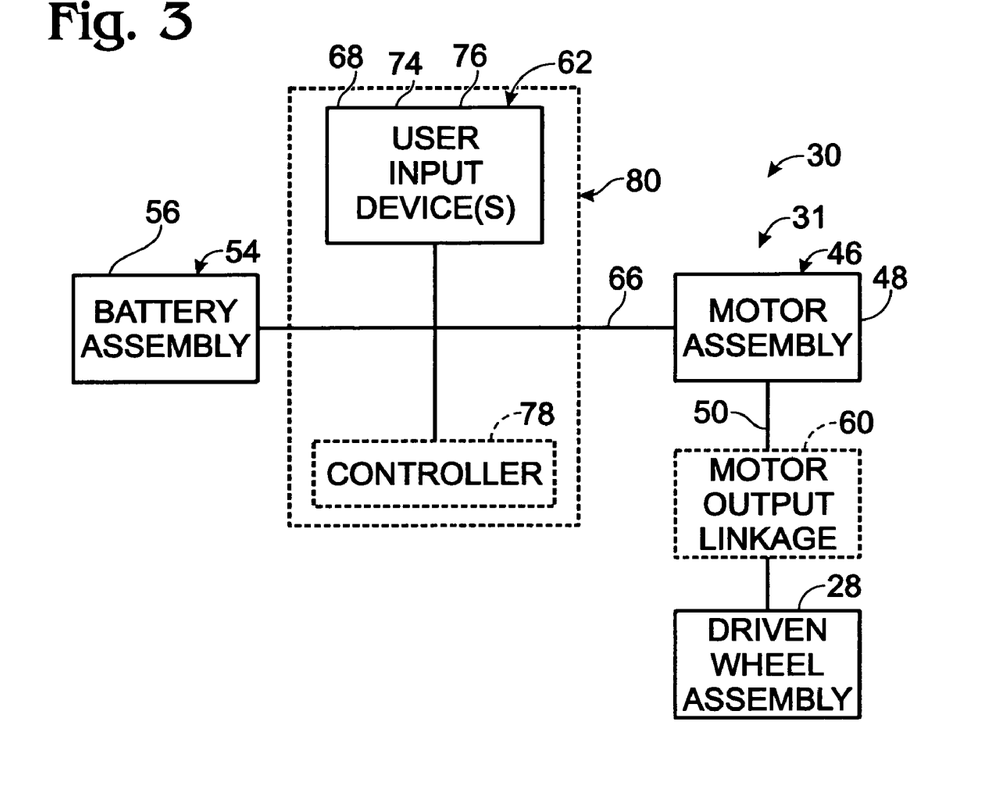
FIG. 3 is a schematic diagram of an illustrative, non-exclusive example of a motorized drive assembly suitable for use with a children's ride-on vehicle, such as the vehicle of FIG. 1.

In FIG. 3, an illustrative, non-exclusive example of a suitable drive assembly 30 for a children's ride-on vehicle, such as vehicle 10, is schematically illustrated. Drive assembly 30 is adapted to drive the rotation of driven wheel assembly 28. The drive assembly 30 may be referred to as a motorized drive assembly 31 and includes a motor assembly 46, which includes at least one battery-powered motor 48 that is adapted to drive the rotation of at least one of the plurality of wheels. The motor assembly 46 includes an output 50 that provides a rotational input to the driven wheel assembly 28, such as to the hub portion of one or more of the wheels 22 in driven wheel assembly 28. Typically, the output 50 from each of the at least one motors includes a rotating shaft and/or a rotating pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly 46 may be coupled to raise and lower the blade of a ride-on that resembles a bulldozer, the bucket of a ride-on that resembles a skid-steer or other loader, the bed of a ride-on that resembles a dump truck, etc.

Power for the motor assembly 46 may be provided by battery assembly 54. Battery assembly 54 includes at least one rechargeable battery, or cell, 56 that is adapted to provide power to the motor assembly. The batteries in battery assembly 54 may be able to be selectively disconnected from the motor assembly and connected to a charging assembly to recharge the batteries. Any suitable type and number of batteries, or cells, may be used in battery assembly 54. For example, one or more six-, twelve-, eighteen-, or twenty-four-volt batteries have proven effective. The motor assembly 46 may be operably connected to the battery assembly 54 by any suitable electrical connectors, such as cables, wires, positive and negative terminals or leads, one or more plugs and corresponding sockets, and the like.

In FIG. 3, drive assembly 31 is shown further including an optional motor output linkage 60 that mechanically interconnects the motor assembly 46 with the driven wheel assembly 28. Motor output linkage 60 is any suitable mechanism that transmits the rotational input from the motor assembly's output(s) to the driven wheel assembly 28, such as to the hub portion of one or more of the wheels 22 in driven wheel assembly 28. Examples of suitable linkages include an intermediate linkage between the output 50 of the motor assembly 46 and the driven wheel assembly 28, such as a gearbox containing one or more gears, a belt or chain drive, a worm gear, one or more individual gears, and the like. The motor output linkage 60 may be adapted to transmit the rotational input from the output 50 to the driven wheel assembly 28 at the same relative rate of rotation, or it may mechanically augment the rotational input to convey a greater or lesser rate of rotation relative to the rate of rotation of the output 50. It is also within the scope of the disclosure that drive assembly 31 may be formed without motor output linkage 60, in which case rotational input from the output(s) of the motor assembly 46 may be directly transmitted to the driven wheel assembly 28.

As schematically illustrated in FIG. 3, drive assembly 31 may also include one or more user input devices 62 that are adapted to convey inputs from a child sitting on seat 18 to the drive assembly. User input devices 62 also may be referred to as user control devices. These devices convey a user's inputs, such as via the vehicle's wiring harness 66, and affect the actuation of the motor assembly 46, such as by causing the actuation (or energization) of the motor assembly, selecting between a range of electronic configurations, selecting the direction of rotation of the motor assembly's output 50, selecting the relative degree of a maximum rate of rotation to which the motor assembly is actuated, etc. Examples of suitable user input devices 62 include a drive actuator 68, through which a user input directing the battery assembly 54 to energize the motor assembly 46 is received. Examples of suitable drive actuators 68 include an on/off switch, a foot pedal, a throttle lever, and a rotational handgrip on a steering mechanism that includes a handlebar. In FIG. 2, an example of a drive actuator 68 is shown in the form of a foot pedal 70 positioned for actuation by a child sitting on seat 18. When drive actuator 68 takes a form other than a foot pedal, it may be located in any suitable location within or near passenger compartment 14 so that a child sitting on seat 18 may reach the actuator while positioned to operate the vehicle 10. For example, an on/off switch or throttle may be located on the body or on the steering mechanism 42, such as illustrated at 72 in FIG. 2.

As schematically illustrated in FIGS. 2 and 3, other examples of user input devices 62 include a speed switch 74, which enables a user to select the relative rate of rotation of the motor assembly's output 50, and a direction switch 76, which enables a user to select the relative direction (i.e., clockwise or counterclockwise) of rotation of output 50 and thereby configure the vehicle 10 to drive in forward and reverse directions. Switches 74 and 76 may be located in any suitable location on body 12 or steering assembly 26 for actuation by a child sitting on seat 18. An example of a suitable speed switch 74 is a switch that selectively configures a pair of batteries between series and parallel configurations to define relative "high" and "low" speed configurations. Speed switch 74 may additionally or alternatively selectively configure a pair of motors between series and parallel configurations. As a further example, the switches may convey inputs to a controller, such as subsequently described controller 78, which, responsive to inputs from the switches, configures the vehicle 10 for a selected operating state.

As illustrated in FIG. 3, drive assembly 31 may (but is not required to) further include a controller 78, which is adapted to control electronically the transmission of the rotational input from the motor assembly 46 to the driven wheel assembly 28. More specifically, controller 78 may include a microprocessor or suitable control circuit that is adapted to control the actuation, or energization, of the motor assembly 46 by the battery assembly 54 to regulate electronically the rotational input transmitted by the motor assembly 46 to the driven wheel assembly 28. Controller 78 may regulate at least one of the timing and the ramp, or rate, of application of the transmission of the rotational input after actuation of a corresponding user input device 62 by a child sitting on seat 18. In other words, the controller 78 may delay in at least time and/or rate of transmission the rotational input to the driven wheel assembly 28 responsive at least in part to a user input selecting the desired, or selected, rotational input. An illustrative example of a suitable controller is disclosed in U.S. Pat. No. 6,771,034, the complete disclosure of which is hereby incorporated by reference for all purposes. As used herein, the one or more user input devices 62 and, when present, controller 78 that are adapted to configure the vehicle's drive assembly 31 between a plurality of operating states may be referred to collectively as the vehicle's speed control assembly 80.

As shown in FIG. 2, body 12 may also include at least one battery compartment 82 that is adapted to receive battery assembly 54. The battery compartment may take any of a variety of different shapes, sizes, and configurations depending on such factors as the form of vehicle 10, the portion of the vehicle's body within which the compartment is formed, and the size and shape of battery assembly 54. FIG. 2 provides graphical illustrations of several suitable, non-exclusive positions for battery compartment 82. The battery compartment may include a cover or other closure to selectively restrict access to the battery assembly during use of the vehicle. The compartment may additionally or alternatively include a suitable retainer to position and/or secure the battery assembly within the battery compartment.

Figure 4:
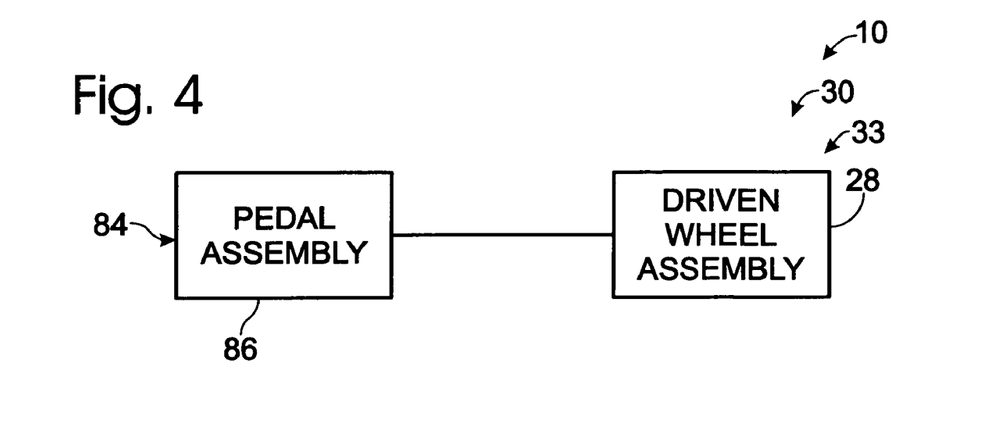
FIG. 4 is a schematic diagram of an illustrative, non-exclusive example of a manually powered drive assembly suitable for use with a children's ride-on vehicle.

The previously described drive assembly provided an example of a motorized drive assembly having at least one battery-powered motor. It is also within the scope of the present disclosure that children's ride-on vehicles 10 according to the present disclosure may additionally or alternatively include a manually powered drive assembly. As an illustrative example, a manually powered drive assembly may include a pedal assembly having pedals that are coupled to at least one of the plurality of wheels so that the wheels are rotatably driven as a child seated on seat 18 reciprocates the pedals. An illustrative, non-exclusive example of a suitable pedal assembly is disclosed in U.S. Pat. No. 6,651,528, the complete disclosure of which is hereby incorporated by reference for all purposes. An illustrative, non-exclusive example of a drive assembly 30 in the form of a manually powered drive assembly is schematically illustrated in FIG. 4 and generally indicated at 33. As illustrated, drive assembly 33 is a pedal-powered drive assembly in which driven wheel assembly 28 is operatively coupled to a pedal assembly 84 having pedals 86. Reciprocating rotation of pedals 86 drives the rotation of driven wheel assembly 28. It is also within the scope of the present disclosure that children's ride-on vehicles 10 having bodies 12 may be formed without a drive assembly and therefore may be adapted to be propelled by a child seated on seat 18 pushing the vehicle with the child's feet in a foot-to-floor manner, or by an adult who pushes the vehicle through any suitable mechanism.

Figure 5:
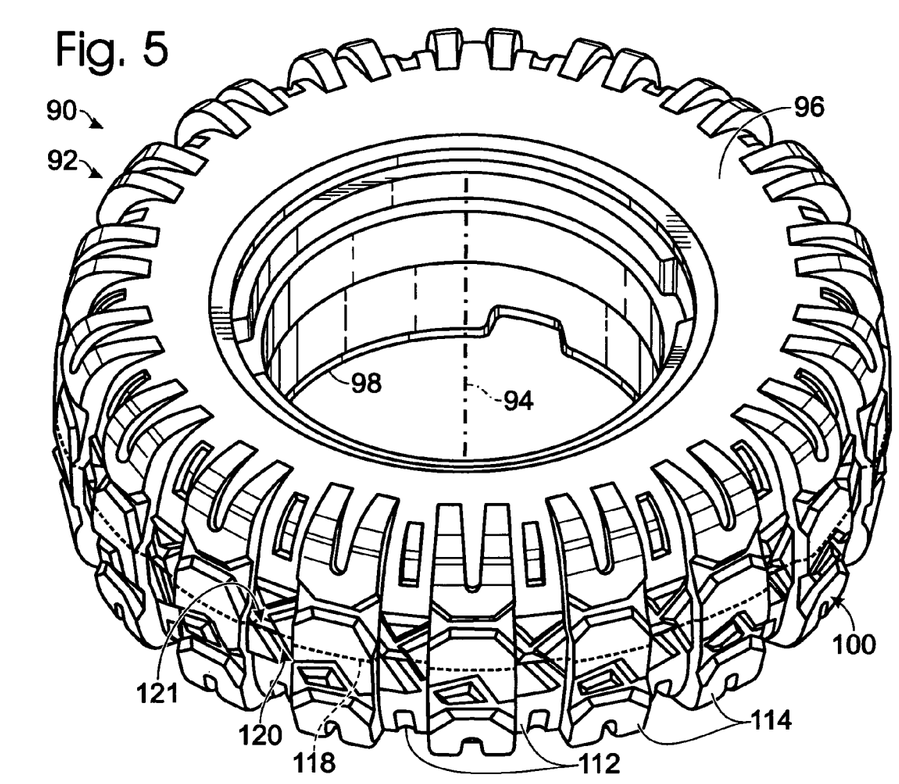
FIG. 5 is a perspective view of an illustrative example of a blow-molded wheel that has an undulating central tread and is suitable for use with a children's ride-on vehicle, such as the vehicle of FIG. 1.
Figure 6:
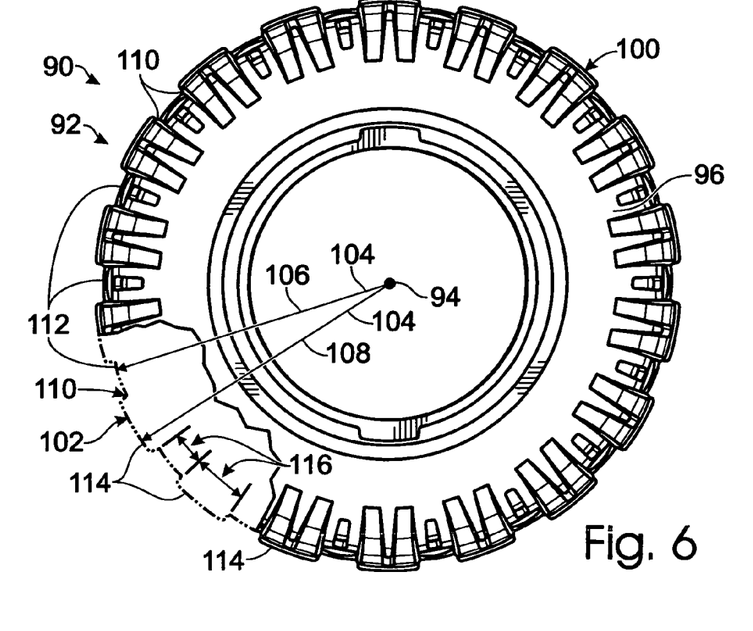
FIG. 6 is a side elevation view of the wheel of FIG. 5 that is partially cutaway to show the circumferential profile of the wheel.

In FIGS. 5 and 6, an illustrative, non-exclusive example of a blow-molded wheel according to the present disclosure is shown at 90. As illustrated, wheel 90 has an undulating central tread. Unless otherwise specified, blow-molded wheel 90 may, but is not required to, contain at least one of the structure, components, functionality, and/or variations as the other blow-molded wheels described and/or illustrated herein. Wheel 90 includes a blow-molded wheel body 92 that is configured to rotate about an axis 94.

As shown in FIGS. 5 and 6, blow-molded body 92 may be configured to generally resemble an un-mounted vehicle tire such that blow-molded body 92 forms a tire portion that may be suitably attached to a separate hub portion to form a wheel, as discussed above. However, it is within the scope of this disclosure for some embodiments of blow-molded body 92 to additionally include some or all of the hub portion of a wheel, such as where the blow-molded body integrally includes a tire portion and a hub portion.

The blow-molded molded body 92 may include first and second sidewalls 96 and 98, and a tread surface 100 that extends circumferentially around the blow-molded body. In some embodiments, tread surface 100 may be configured to resemble the traction-enhancing tread patterns that may typically be found on the wheels of full-size vehicles, such as the rubber tires found on automobiles, trucks, off-road vehicles, or the like, or any of the various types of steel tires found on some forms of construction or other industrial vehicles. As shown in FIG. 6, the tread surface 100 of blow-molded body 92 has a circumferential profile 102 that is defined as the locus of points at which the radial distance 104, or radius, from axis 94 to tread surface 100 is greatest at each position around the circumference of tread surface 100.

The circumferential profile 102 of blow-molded body 92 may be located anywhere between the first and second sidewalls 96 and 98 of the blow-molded molded body. For example, as shown in the illustrative example presented in FIGS. 5 and 6, the circumferential profile 102 may lie generally in a plane that is normal, or perpendicular, to axis 94 and generally centered between the first and second sidewalls 96 and 98 of blow-molded molded body 92. However, this positioning of the circumferential profile is not required to all embodiments. For example, it is within the scope of the present disclosure that, rather than being centered, the circumferential profile may lie in a plane closer to, or proximate, one of the first and second sidewalls of the blow-molded body, such as where the tread surface has an at least partially frusto-conical, frusto-spherical, or frusto-elliptical shape. As additional illustrative, non-exclusive examples, it is also within the scope of the present disclosure that the circumferential profile may lie in a plane that is obliquely oriented relative to axis 94 and/or that rather than lying in a plane, the circumferential profile may waver, or extend at varying distances, between the first and second sidewalls 96 and 98 as the circumferential profile proceeds around the circumference of tread surface 100.

The radial distance 104 from axis 94 to circumferential profile 102 may vary along circumferential profile 102 such that tread surface 100 may have an undulating circumferential profile, as perhaps best seen in FIG. 6. In particular, the radial distance 104 from axis 94 to circumferential profile 102 may change, or transition, from a first radius 106 to a larger second radius 108 at a plurality of spaced-apart positions along circumferential profile 102. Second radius 108 may exceed, or be larger than, first radius 106 by at least a predetermined percentage of radial distance 104 or by at least a predetermined fixed amount. As illustrative, non-exclusive examples, second radius 108 may be larger than first radius 106 by at least (approximately) 3 mm (millimeters), 6 mm, 10 mm, 12.7 mm, 25 mm, or more. Similarly, second radius 108 may be at least (approximately) 105%, 110%, 115%, 120%, or 125% as large as first radius 106. The change, or transition, in radial distance 104 from first radius 106 to second radius 108, or the reverse, may occur in a plurality of transition regions 110, which may extend between adjacent ones of a plurality of first and second regions 112 and 114. Each of the plurality of first regions 112 may have a radius corresponding to the first radius 106, which may be uniform throughout the first region 112, and each of the plurality of second regions 114 may have a radius corresponding to the second radius 108, which may be uniform throughout the second region 114. As shown in the illustrative embodiment presented in FIG. 5, at least one of first regions 112 and/or at least one of second regions 114 may generally extend from first sidewall 96 to second sidewall 98, such as where at least one of first regions 112 and/or at least one of second regions 114 may be substantially parallel to axis 94.

Any of the plurality of first regions 112, second regions 114, and transition regions 110 may extend along circumferential profile 102 for any angular portion 116 thereof, such as an angular portion between 0 and 360 degrees, such as an angular portion of at least (approximately) 10 degrees, 15 degrees, 18 degrees, 20 degrees, 30 degrees, 36 degrees, 45 degrees, 60 degrees, or 90 degrees, or more. Further, any of the plurality of first regions 112 may extend over a greater or lesser angular portion 116 of circumferential profile 102 than a given one of the plurality of second regions 114. For example, at least one of the plurality of first regions 112 may extend over an angular portion 116 that is at least (approximately) 25%, 50%, 75%, 100%, 125%, 150%, 175%, 200%, or even 300% or more the size of the angular portion 116 over which at least one of the second regions 114 extends. Additionally, any of the transition regions 110 may extend over a greater or lesser angular portion 116 of circumferential profile 102 than a given one of the plurality of first regions 112 or second regions 114. For example, at least one of the transition regions 110 may extend over an angular portion 116 that is at least (approximately) 1%, 5%, 10%, 25%, 50%, 75%, 100%, 125%, 150%, 175%, 200%, or even 300% or more the size of the angular portion 116 over which a given one of the plurality of first regions 112 or second regions 114 extends.

In some embodiments, the change or transition between first radius 106 and second radius 108 may be smooth. For example, radial distance 104 may smoothly and/or continuously vary or transition from a first radius 106 to a second radius 108, such as in the manner of a sand or paddle tire that may be used on an off-road vehicle. In some embodiments, the change or transition between first radius 106 and second radius 108 may be relatively abrupt. For example, at least one of the plurality of transition regions 110 may extend at an angle relative to one or more of the adjacent first region 112 or second region 114 of the circumferential profile. Exemplary angles at which a transition region may extend may include an angle in the range of 30 degrees to 150 degrees, such as an angle in the range of 45 and 135 degrees, in the range of 60 and 135 degrees, in the range of 70 and 110 degrees, and/or a 90 degree angle.

The blow-molded body 92 may have a part line 118, as shown in dashed lines in FIG. 5. Part line 118 may correspond to the interface between the portions of the mold used to mold blow-molded body 92, which process will be more fully discussed below. Part line 118 may be at least partially coplanar with the circumferential profile 102. In some embodiments, tread surface 100 may include one or more optional channels 120, which (when present) may extend across part line 118. Channels 120 may enhance the appearance or traction of tread surface 100. As shown in FIG. 5, channels 120 may be obliquely oriented relative to circumferential profile 102 and/or part line 118. In some embodiments, an optional web, or rib, 121 may extend across channel 120 such that the obliquely oriented channel 120 is divided at the part line into a pair of channels that do not cross the part line. Web 121 may be beneficial when using an axially moving tool to remove mold flash from part line 118. In particular, by dividing the obliquely oriented channel 120 at part line 118, web 121 may preclude the need for an axially moving mold-flash-removing tool to remove flash from any obliquely oriented channels on tread surface 100.

Figure 7:
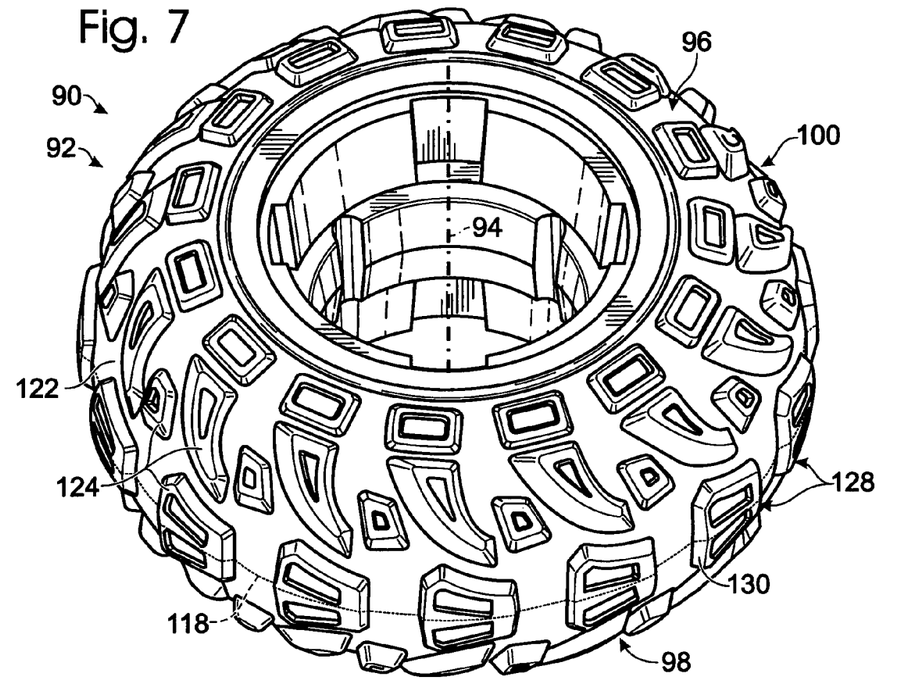
FIG. 7 is a perspective view of another illustrative example of a blow-molded wheel that has an undulating central tread and is suitable for use with a children's ride-on vehicle, such as the vehicle of FIG. 1.
Figure 8:
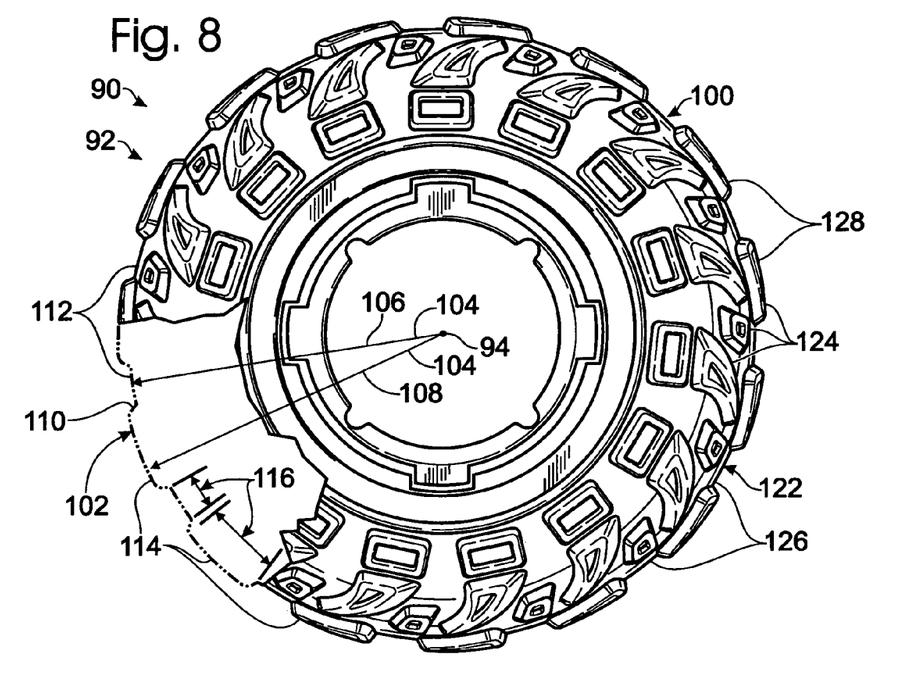
FIG. 8 is a side elevation view of the wheel of FIG. 7 that is partially cutaway to show the circumferential profile of the wheel.

In FIGS. 7 and 8, another illustrative, non-exclusive example of a blow-molded wheel that has an undulating central tread according to the present disclosure is shown at 90. Unless otherwise specified, blow-molded wheel 90 may, but is not required to, contain at least one or more of the structure, components, functionality, and/or variations as the other blow-molded wheels described and/or illustrated herein. The tread surface 100 of blow-molded body 92 may include a base surface 122 and a plurality of spaced-apart tread blocks 124, as shown in FIGS. 7 and 8. Tread blocks 124 may be disposed on base surface 122 and extend outwardly therefrom. Tread blocks 124 may additionally or alternatively be described as projecting tread portions. The tread blocks and base surface may be integrally formed during the blow-molding process used to form wheel 90. As shown in FIGS. 7 and 8, blow-molded wheel 90 may be configured to resemble a tire suitable for use on a simulated off-road vehicle or all-terrain vehicle (ATV).

A plurality of tread blocks 128 may be periodically disposed, or otherwise disposed at spaced-apart intervals, around the circumference of base surface 122, as shown in FIGS. 7 and 8. As shown in FIG. 8, the circumferential profile 102 of blow-molded body 92 may include tread blocks 128 alternating with portions 126 of base surface 122. The portions 126 of base surface 122 may correspond to the plurality of first regions 112 of circumferential profile 102, which may define a radius corresponding to the first radius 106 of circumferential profile 102. Tread blocks 128 may correspond to the plurality of second regions 114, which may define a radius corresponding to the second radius 108 of circumferential profile 102. It is within the scope of the present disclosure that tread blocks 128 may be variably disposed between the first and second sidewalls 96 and 98, such that circumferential profile 102, which passes through tread blocks 128, may waver, or variably extend, between the first and second sidewalls 96 and 98 as the circumferential profile proceeds around the circumference of tread surface 100 while passing through tread blocks 128.

Tread surface 100 may include a plurality of transition regions 130, which extend between tread blocks 128 and base surface 122, as shown in FIG. 7. Transition regions 130 may extend at an angle relative to base surface 122, such as an angle in the range of 30 degrees to 150 degrees, an angle in the range of 45 and 135 degrees, an angle in the range of 80 and 110 degrees, and a 90 degree angle. At least a portion of at least one of the plurality of transition regions 130 may define a portion of circumferential profile 102, such as transition region 110, as shown in FIG. 8.

Figure 9:
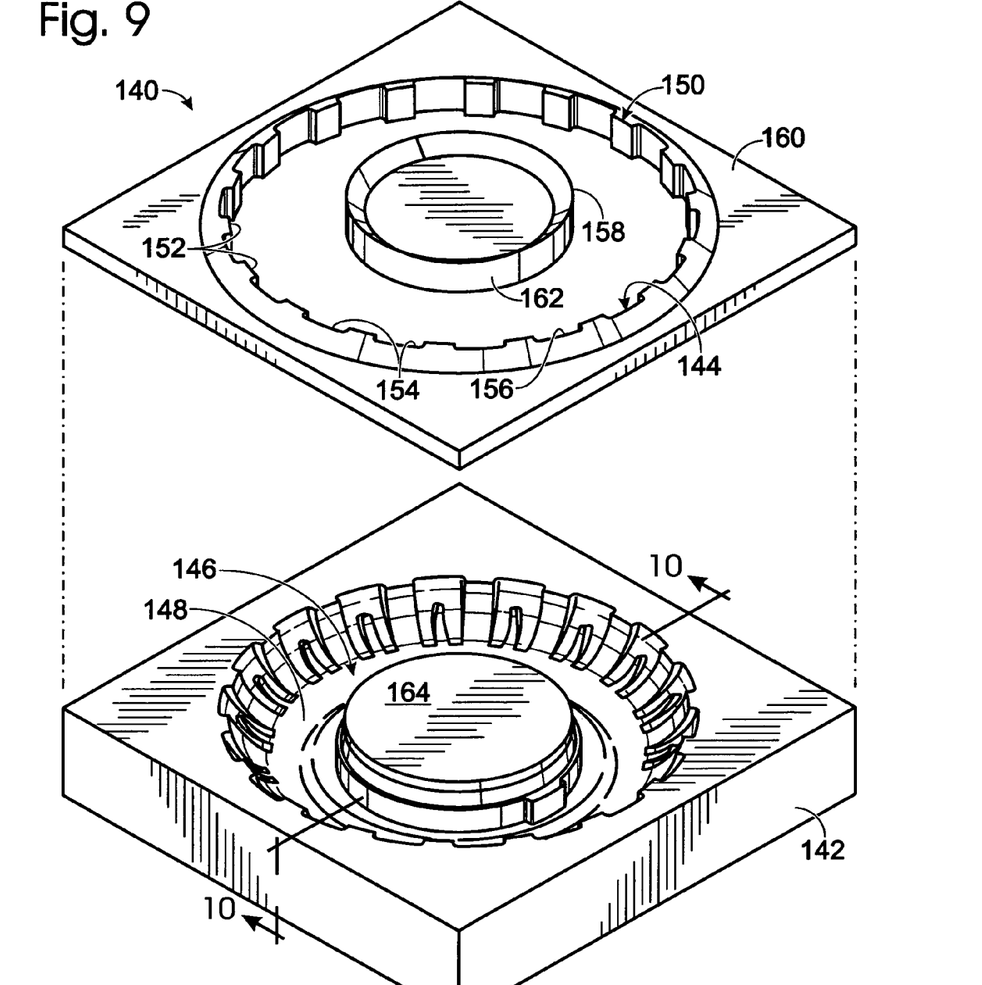
FIG. 9 is an exploded perspective view of a first portion of a simplified mold for producing a wheel that has an undulating central tread, such as a wheel similar to the wheel of FIG. 5, with the pinch-offs shown separated from the main mold portion.
Figure 10:
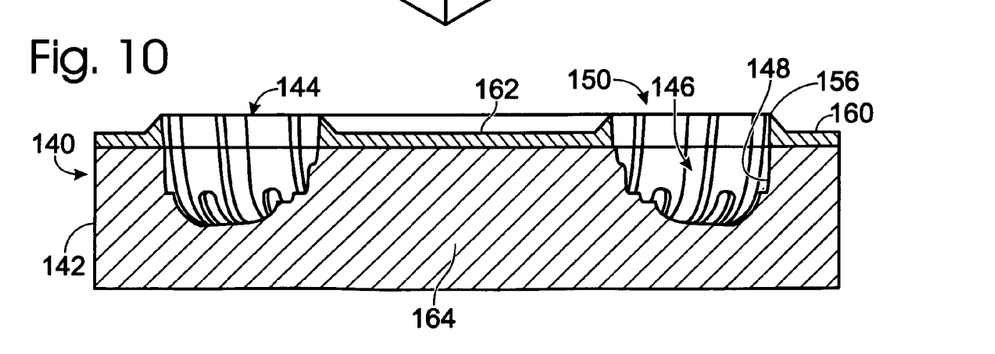
FIG. 10 is a section view of the mold portion of FIG. 9, taken generally along line 10-10 in FIG. 9, with the pinch-offs shown attached to the main mold portion.

In FIGS. 9 and 10, an illustrative, non-exclusive example of a first portion of a simplified mold for producing a wheel (90) that has an undulating central tread according to the present disclosure is shown at 140. Unless otherwise specified, the second portion of the mold (not shown) may, but is not required to, contain at least one of the structure, components, functionality, and/or variations as the first mold portion described and/or illustrated herein. In some embodiments, the second mold portion may be a mirror image, or at least substantially identical to, the first mold portion, although this is not required. Although mold portion 140 is simplified, relevant portions of mold portion 140 will be discussed with regard to the corresponding portions of the various embodiments of blow-molded wheel 90 discussed above. However, it should be understood that a mold that is based on mold portion 140 may be used to manufacture any blow-molded wheel having an undulating central tread, which may, but is not required to, contain at least one of the structure, components, functionality, and/or variations as any of the blow-molded wheels described and/or illustrated herein. Further, it is within the scope of the present disclosure that wheels 90 according to the present disclosure may be manufactured in any suitable mold and/or molding process, which may, but is not required to, contain at least one of the structure, components, functionality, and/or variations of the mold portion described and/or illustrated herein.

As illustrated in FIGS. 9 and 10, mold portion 140 may include a main mold portion 142 and at least one pinch-off ring 144. The main mold portion 142 includes a cavity 146 that has an internal surface 148 that is configured to define the exterior shape of a wheel that is blow-molded or otherwise formed within cavity 146.

The at least one pinch-off ring 144 of the first mold portion 140 is configured to engage the at least one pinch-off ring of the second mold portion (not shown) when the first and second mold portions are brought together to form a full mold cavity during a molding operation. The interface between the pinch-off rings of the first and second mold portions when the mold is closed may define the part line of the mold. As shown in FIGS. 9 and 10, pinch-off ring 144 may have a planar configuration, which would correspond to a planar part line blow-molded wheel 90 that may lie in a plane that is normal to axis 94 of blow-molded wheel 90. As discussed, it is also within the scope of the present disclosure that the pinch-off ring may be configured to create a planar part line that lies in a plane that is oblique to the axis of the wheel or a part line that has a non-planar configuration.

As shown in FIG. 9, pinch-off ring 144 may include an opening 150, which is configured to form a circumferential profile on a blow-molded wheel, such as a wheel similar to blow-molded wheel 90. The opening 150 may include a plurality of first portions or regions 152 that may alternate with a plurality of second portions or regions 154. The first portions or regions 152 may have a radius that corresponds to first radius 106, and the second portions or regions 154 may have a radius that corresponds to second radius 108, which may be larger than first radius 106, as discussed above. In some embodiments, pinch-off ring 144 may include a sharpened edge 156 for impingement on a parison when the first and second mold portions are brought together to form the full mold cavity during the molding process.

In some embodiments, first mold portion 140 may include an optional inner pinch-off ring 158, as shown in FIGS. 9 and 10. Inclusion of an inner pinch-off ring 158 may permit the formation of annular blow-molded bodies 92, which may correspond to only the tire portion 40 of a blow-molded wheel. In some embodiments, inner pinch-off ring 158 may include a sharpened edge for impingement on the parison when the first and second mold portions are brought together.

One or more of the pinch-off rings used with first mold portion 140 may be a distinct component from main mold portion 142. For example, as shown in FIGS. 9 and 10, pinch-off ring 144 may be a part of a pinch-off plate 160 that may be attached to main mold portion 142 and/or inner pinch-off ring 158 may be a part of a pinch-off core 162 that may be attached to a central portion 164 of main mold portion 142. When used with main mold portion 142, pinch-off plate 160 and/or pinch-off core 162 may form at least a portion of cavity 146 and/or internal surface 148, as shown in FIGS. 9 and 10. Pinch-off plate 160 and pinch-off core 162 may be attached to first mold portion 140 using any suitable attachment method, such as bolts, adhesives, clips, welding, or the like. Pinch-off plate 160 and/or pinch-off core 162 may be removably, permanently, or semi-permanently attached to mold portion 140. Use of a removable or semi-permanent attachment may improve the lifespan of mold portion 140, such as by permitting repair, replacement, and/or substitution of pinch-off plate 160 and/or pinch-off core 162.

In some embodiments, pinch-off plate 160 and/or pinch-off core 162 may be fabricated from a material different than the material used for main mold portion 142 to address the different conditions that the various mold components may experience during use. For example, the internal surface 148 of the mold cavity 146 may experience relatively little wear during use such that the main mold portion 142 may be fabricated from relatively softer material such as aluminum. In contrast, pinch-off rings 144 and/or 158 may experience relatively greater wear during use, such as when pinch-off ring 144 and/or inner pinch-off ring 158 include a sharpened edge, which may tend to dull during extended use. Thus, the wear properties and/or the tool life of pinch-off plate 160 and/or pinch-off core 162 may be improved if pinch-off plate 160 and/or pinch-off core 162 are fabricated from a harder material than is used for main mold portion 142. Illustrative, non-exclusive examples of materials that may be suitable for pinch-off plate 160 and/or pinch-off core 162 may include a nickel-copper alloy, such as Ampcoloy 940, which has a Rockwell hardness of 94B and is sold by Ampco Metal Inc. of Arlington Heights, Ill., or a beryllium-copper alloy, such as MoldMAX HH®, which has a Rockwell hardness of 40C and is sold by Brush Wellman Incorporated of Cleveland, Ohio.

Figure 11:
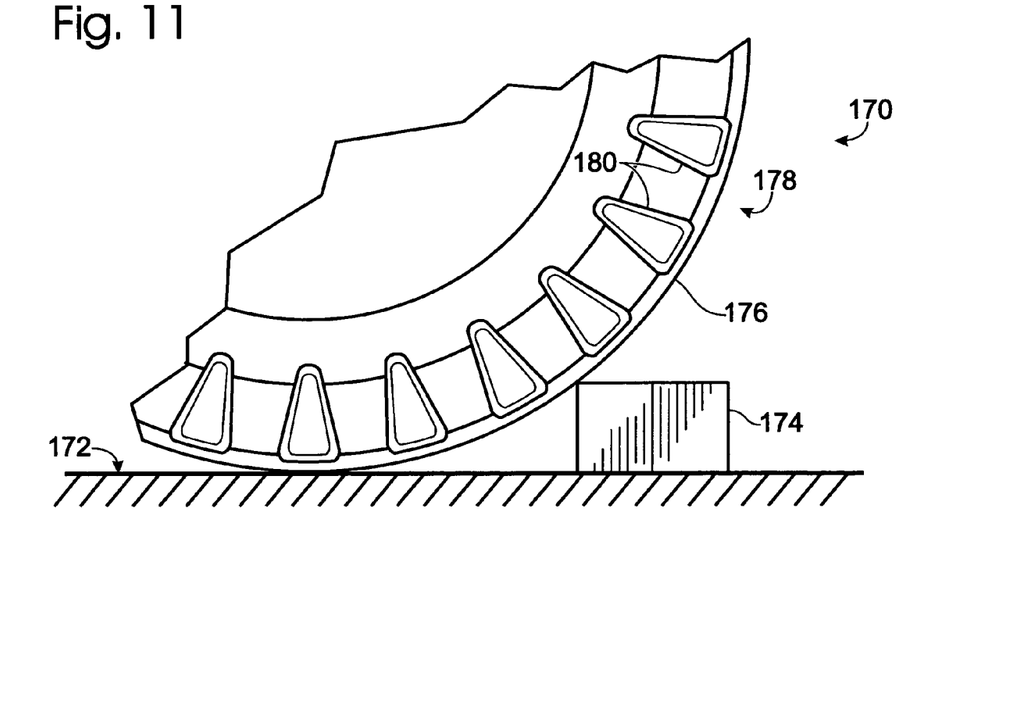
FIG. 11 is a schematic representation of a blow-molded wheel that has a circular ground-contacting surface shown attempting to surmount an obstacle.
Figure 12:
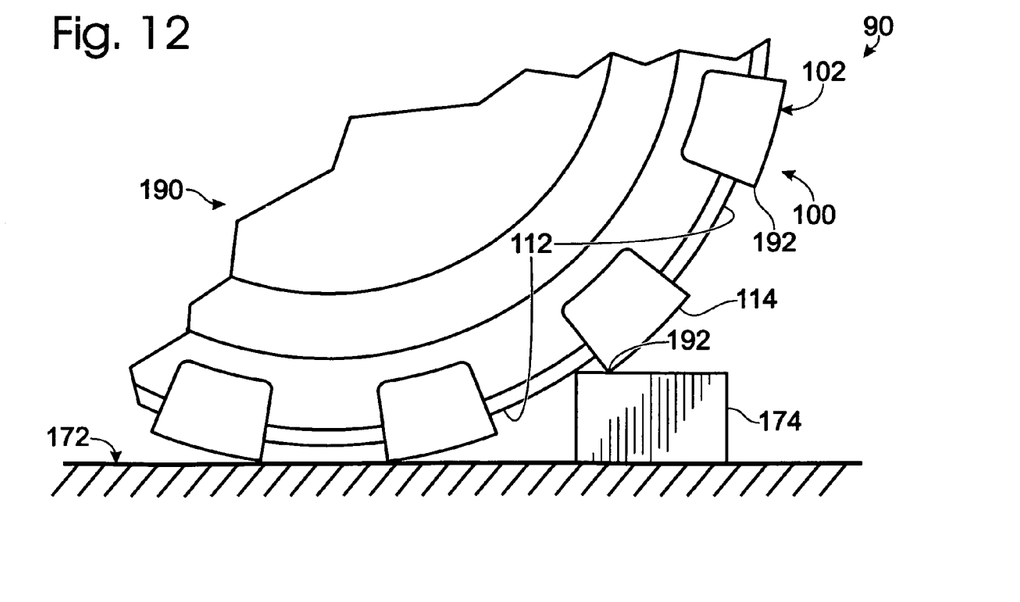
FIG. 12 is a schematic representation of a blow-molded wheel according to the present disclosure that has an undulating central tread shown attempting to surmount an obstacle.

FIGS. 11 and 12 compare the obstacle surmounting ability of a blow-molded wheel that has a circular ground-contacting surface with the obstacle surmounting ability of a blow-molded wheel that has an undulating central tread.

In FIG. 11, a schematic example of a blow-molded wheel that has a circular ground-contacting surface is shown at 170. As shown in FIG. 11, wheel 170 contacts the ground 172 and any obstacles 174 with at least its circular "run-flat" surface 176. As such, the ability of wheel 170 to surmount obstacle 174 must rely on friction between the run-flat surface 176 and obstacle 174, and/or the momentum of the children's ride-on vehicle when surface 176 strikes the obstacle. Although the tread surface 178 of wheel 170 may include lateral, or recessed, tread blocks 180, such features are merely present for aesthetic reasons, because only the run flat surface 176 defines the circumferential, or greatest diameter portion, of the wheel and thereby is the primary, or even exclusive, portion of the wheel that contacts ground 172 and obstacle 174.

In FIG. 12, a schematic example of a blow-molded wheel 90 that has an undulating central tread is shown at 190. Unless otherwise specified, blow-molded wheel 190 may, but is not required to, contain at least one of the structure, components, functionality, and/or variations as the other blow-molded wheels described and/or illustrated herein. As shown in FIG. 12, the undulations in the circumferential profile 102 of tread surface 100 of wheel 190 may include a plurality of edges 192 which may effectively engage obstacle 174 such that wheel 190 may more readily surmount the obstacle.

In some embodiments, blow-molded wheel 90 may be configured such that, when used with ride-on vehicle 10, wheel 90 may be designed to slip against an obstacle having a height that exceeds a predetermined threshold, such as to limit the extent to which vehicle 10 with wheels 90 according to the present disclosure may readily climb over an obstacle. For example, the predetermined threshold may be selected so that a ride-on with wheels 90 according to the present disclosure is designed to climb over an obstacle of up to a certain height, while not being designed to climb over an obstacle having a height that exceeds this threshold height. As an illustrative, non-exclusive example, the wheels may be designed so that the vehicle may climb over (such as by edges 192 engaging an upper surface of the obstacle) an obstacle having a height of up to 20 mm, 25 mm, 50 mm, 75 mm, etc., while not being able to climb over (i.e., having wheels 90 that are shaped to slip against) an obstacle having an upper surface that exceeds this selected threshold height (such as because edges 192 are not sufficiently positioned or sized to engage an upper surface of the obstacle).

As a more specific illustrative example, in some embodiments it may be desirable for a children's ride-on vehicle with at least front wheels 90 according to the present disclosure to be designed to not be able to climb over curbs or other obstacles having (upper surface) heights of at least 3 or 4 inches, but to be able to climb over smaller rocks, hoses, sticks, and the like having shorter heights. In other embodiments, the ride-on vehicle may be designed to be able to climb over these illustrative curbs. The predetermined threshold may be defined by one or more of the dimensions of blow-molded wheel 90, such as radial distance 104, the relative differences between the first and second radii, first and second portion spacing and/or dimensions, etc. The dimensions of ride-on vehicle 10, such as length, wheelbase, mass, and/or the location of the center of gravity of the vehicle may also positively or negatively affect the ability of the vehicle to climb over obstacles.

In some embodiments, a children's ride-on vehicle 10 with a plurality of wheels 22 that includes at least one wheel 90 according to the present disclosure may only include wheels 90, while in other embodiments, the plurality of wheels may include one or more wheels that do not having the undulating tread described herein. As an illustrative, non-exclusive example of a children's ride-on vehicle in which the plurality of wheels are not all wheels 90, a children's ride-on vehicle 10 may include wheels 90 as its front wheels, such as to provide greater climbing, or obstacle-overcoming ability, when traveling in a forward direction, and with its rear wheels having a different geometry or design, such as one that does not include the undulating tread described herein with respect to wheels 90.

Wheels 90 that have an undulating tread according to the present disclosure may be produced using a blow-molding process, although it is also within the scope of the present disclosure that the wheels (90) that are described and/or illustrated herein may additionally or alternatively be formed from another suitable process, such as an injection molding process. Therefore, while wheels 90 have been described herein as being blow-molded wheels, they may alternatively be formed by other processes without departing from the scope of the present disclosure. However, in many applications, wheels 90 will be formed from a blow-molding process, which has proven to be cost-effective and reliable. Any suitable plastic or other moldable material may be used to produce wheels 90 according to the present disclosure. The particular choice of materials may vary from application to application, and may vary according to one or more of such illustrative factors as design preferences, wheel size, ride-on vehicle size, ride-on vehicle speed range, ride-on vehicle load-carrying capacity, expected terrain, etc.

A mold suitable for blow-molding a wheel that has an undulating tread may include first and second mold portions that collectively define a cavity that is configured to mold a wheel having an axis. The first and second mold portions may be configured to separate in a direction that is parallel to the axis of the wheel. Unless otherwise specified, one or both of the first and second mold portions may, but are not required to, contain at least one of the structure, components, functionality, and/or variations as the mold portion 140 described and/or illustrated herein.

When a wheel 90 is produced by a blow-molding process in such a mold, a parison of molten material, such as a plastic, may be formed and positioned between the first and second mold portions. The first and second mold portions may be closed on the parison such that a pinch-off ring of either or both of the first and second mold portions impinges on the parison to form a circumferential profile for a blow-molded wheel, such as a blow-molded wheel that has an undulating tread, such as an undulating central tread.

A pressurized gas may be injected into the parison such that the parison may be blown into a blow-molded wheel that has a shape that corresponds to the shape of the mold cavity defined by the first and second mold portions. The shape of the resulting blow-molded wheel may include regions 112 that correspond to the plurality of regions 152 of the mold, which have a radius that corresponds to first radius 106, and regions 114 that correspond to the plurality of regions 154 of the mold, which have a radius that corresponds to second radius 108.

The first and second mold portions may be separated to release the resulting blow-molded wheel from the mold, such as after an optional, and often brief, cool-down period. Subsequent to release from the mold, any portions of the parison that remain attached to the blow-molded wheel may be removed using any suitable method. For example, when the pinch-off rings include a sharpened edge, such as the sharpened edge 156 discussed above, any portions of the parison that remain outside the mold cavity (i.e., molding "flash") may be only minimally attached to the finished blow-molded wheel and may be readily removed, such as by snapping off the molding flash by hand or another suitable process.

In some embodiments, an optional punch may be used to remove the mold-flash, should it be present. Such a punch may include an aperture that defines a circumferential profile corresponding to the circumferential profile of the molded wheel, including a plurality of sections corresponding to the plurality of first regions 112 and a plurality of sections corresponding to the plurality of second regions 114. The aperture of the punch may be configured to adapt to variations in the circumferential profile of the molded wheel, such as variations in shape or diameter, such as variations that may normally be expected during blow-molding operations. In operation, the wheel may be separated from the remaining portions of the parison by causing the punch and/or the blow-molded wheel to move axially relative to each other such that the blow-molded wheel passes through the aperture of the punch such that the blow-molded wheel may be separated from the remaining portions of the parison.

INDUSTRIAL APPLICABILITY

The present disclosure is applicable to blow-molded wheels, methods for producing the same, and children's ride-on vehicles including the same.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
a body having at least one seat sized for a child;
a plurality of wheels rotatably coupled to the body, wherein the plurality of wheels includes at least one driven wheel and at least one steerable wheel, wherein at least one of the plurality of wheels is a blow-molded wheel that comprises:
a blow-molded wheel body having a tread surface and an axis, wherein the wheel body is configured to rotate about the axis, wherein the tread surface extends circumferentially around the wheel body, includes ground-contacting regions, and has a first circumferential profile and a second circumferential profile, wherein the first circumferential profile is defined as the locus of points at which the radial distance from the axis to the tread surface is greatest at each position around the circumference of the tread surface, wherein the radial distance from the axis to the first circumferential profile changes from a first-circumferential-profile first-radius to a first-circumferential-profile second-radius at a plurality of spaced-apart positions along the first circumferential profile, wherein the first-circumferential-profile second-radius is larger than the first-circumferential-profile first-radius, wherein the radial distance from the axis to the second circumferential profile changes from a second-circumferential-profile first-radius to a second-circumferential-profile second-radius at a plurality of spaced-apart positions along the second circumferential profile, wherein the second-circumferential profile second-radius is larger than the second-circumferential-profile first-radius, and wherein the first-circumferential-profile first-radius is larger than the second-circumferential-profile first-radius;
a steering assembly comprising a steering mechanism adapted to receive steering inputs from a child sitting on the at least one seat and a steering linkage adapted to convey the steering inputs to the at least one steerable wheel; and
a drive assembly adapted to selectively drive the rotation of the at least one driven wheel.

2. The vehicle of claim 1, wherein the first circumferential profile includes a plurality of alternating first and second regions, each of the first regions having a uniform radius corresponding to the first-circumferential-profile first-radius and each of the second regions having a uniform radius corresponding to the first-circumferential-profile second-radius.

3. The vehicle of claim 2, wherein the first circumferential profile further includes a plurality of transition regions extending between adjacent ones of the plurality of first regions and the plurality of second regions.

4. The vehicle of claim 3, wherein the plurality of transition regions extend at an angle in the range of 30°-150° relative to the first and the second regions.

5. The vehicle of claim 2, wherein the at least one blow-molded wheel comprises a first sidewall and a second sidewall, wherein the second regions extend from the first sidewall to the second sidewall.

6. The vehicle of claim 1, wherein the first circumferential profile and the second circumferential profile lie in respective planes that are normal to the axis of the wheel body.

7. The vehicle of claim 6, wherein the at least one blow-molded wheel comprises a first sidewall and a second sidewall, wherein the plane containing the first circumferential profile is centered between the first and second sidewalls.

8. The vehicle of claim 6, wherein the first circumferential profile is coplanar with a part line of the blow-molded wheel.

9. The vehicle of claim 1, wherein the tread surface includes a base surface and a plurality of tread blocks extending from the base surface.

10. The vehicle of claim 1, wherein the drive assembly further comprises:
a motor assembly comprising at least one electric motor, and
a battery assembly adapted to selectively energize the motor assembly.

11. The vehicle of claim 10, wherein the drive assembly further comprises a speed control assembly, and further wherein the battery assembly is adapted to selectively energize the motor assembly responsive to inputs from the speed control assembly.

12. The vehicle of claim 1, wherein the first circumferential profile and the second circumferential profile are configured such that the at least one blow-molded wheel will slip against an obstacle having a height over a predetermined threshold.

13. The vehicle of claim 1, wherein one of the at least one driven wheel and the at least one steerable wheel is the blow-molded wheel and the other of the at least one driven wheel and the at least one steerable wheel includes a circular ground-contacting surface.

14. The vehicle of claim 1, wherein the first-circumferential-profile second-radius is larger than the second-circumferential-profile second-radius.

15. A children's ride-on vehicle, comprising:
a body having at least one seat sized for a child;
a plurality of wheels rotatably coupled to the body, wherein the plurality of wheels includes at least one driven wheel and at least one steerable wheel, wherein at least one of the plurality of wheels is a blow-molded wheel that comprises:
    a blow-molded wheel body having a tread surface and an axis, wherein the wheel body is configured to rotate about the axis, the tread surface extends around a first circumference and a second circumference of the wheel body, the tread surface includes ground-contacting regions, the tread surface has a first maximum radius relative to the axis at each point around the first circumference of the wheel body, the tread surface has a second maximum radius relative to the axis at each point around the second circumference of the wheel body, and wherein the first maximum radius of the tread surface undulates around the first circumference of the wheel body and the second maximum radius of the tread surface undulates around the second circumference of the wheel body, wherein the first maximum radius defines a first profile and the second maximum radius defines a second profile that is different than the first profile;
    a steering assembly comprising a steering mechanism adapted to receive steering inputs from a child sitting on the at least one seat and a steering linkage adapted to convey the steering inputs to the at least one steerable wheel; and
    a drive assembly adapted to selectively drive the rotation of the at least one driven wheel.

16. The vehicle of claim 15, wherein the first maximum radius of the tread surface periodically undulates between a first-circumference first-radius and a first-circumference second-radius that is larger than the first-circumference first-radius, and wherein the second maximum radius of the tread surface periodically undulates between a second-circumference first-radius and a second-circumference second-radius that is larger than the second-circumference first-radius.

17. The vehicle of claim 15, wherein the points of the tread surface around the first circumference of the wheel body that are disposed at a first maximum radius relative to the axis are all disposed in a first plane normal to the axis, and wherein the points of the tread surface around the second circumference of the wheel body that are disposed at a second maximum radius relative to the axis are all disposed in a second plane normal to the axis.

18. The vehicle of claim 17, wherein the blow-molded wheel body comprises a first sidewall and a second sidewall, and the first plane is centered between the first and second sidewalls.

19. The vehicle of claim 15, wherein at least a portion of the tread surface extends substantially parallel to the axis of the wheel body.

20. The vehicle of claim 15, wherein the tread surface includes a base surface and a plurality of tread blocks extending from the base surface.

21. The vehicle of claim 15, wherein the drive assembly further comprises:
    a motor assembly comprising at least one electric motor, and
    a battery assembly adapted to selectively energize the motor assembly.

22. The vehicle of claim 21, wherein the drive assembly further comprises a speed control assembly, and further wherein the battery assembly is adapted to selectively energize the motor assembly responsive to inputs from the speed control assembly.

23. The vehicle of claim 15, wherein the undulation of the first maximum radius and the second maximum radius of the tread surface are configured such that the blow-molded wheel body will slip against an obstacle having a height over a predetermined threshold.

24. The vehicle of claim 13, wherein the at least one steerable wheel is the blow-molded wheel.

25. The vehicle of claim 15, wherein one of the at least one driven wheel and the at least one steerable wheel is the blow-molded wheel and the other of the at least one driven wheel and the at least one steerable wheel includes a circular ground-contacting surface.

26. The vehicle of claim 25, wherein the at least one steerable wheel is the blow-molded wheel.

* * * * *